Oct. 5, 1943.  W. RUTHVEN  2,330,999
MANUFACTURE OF SELF-LOCKING NUTS
Filed Feb. 6, 1943  2 Sheets-Sheet 1

INVENTOR
William Ruthven
BY
Kenyon & Kenyon
ATTORNEYS

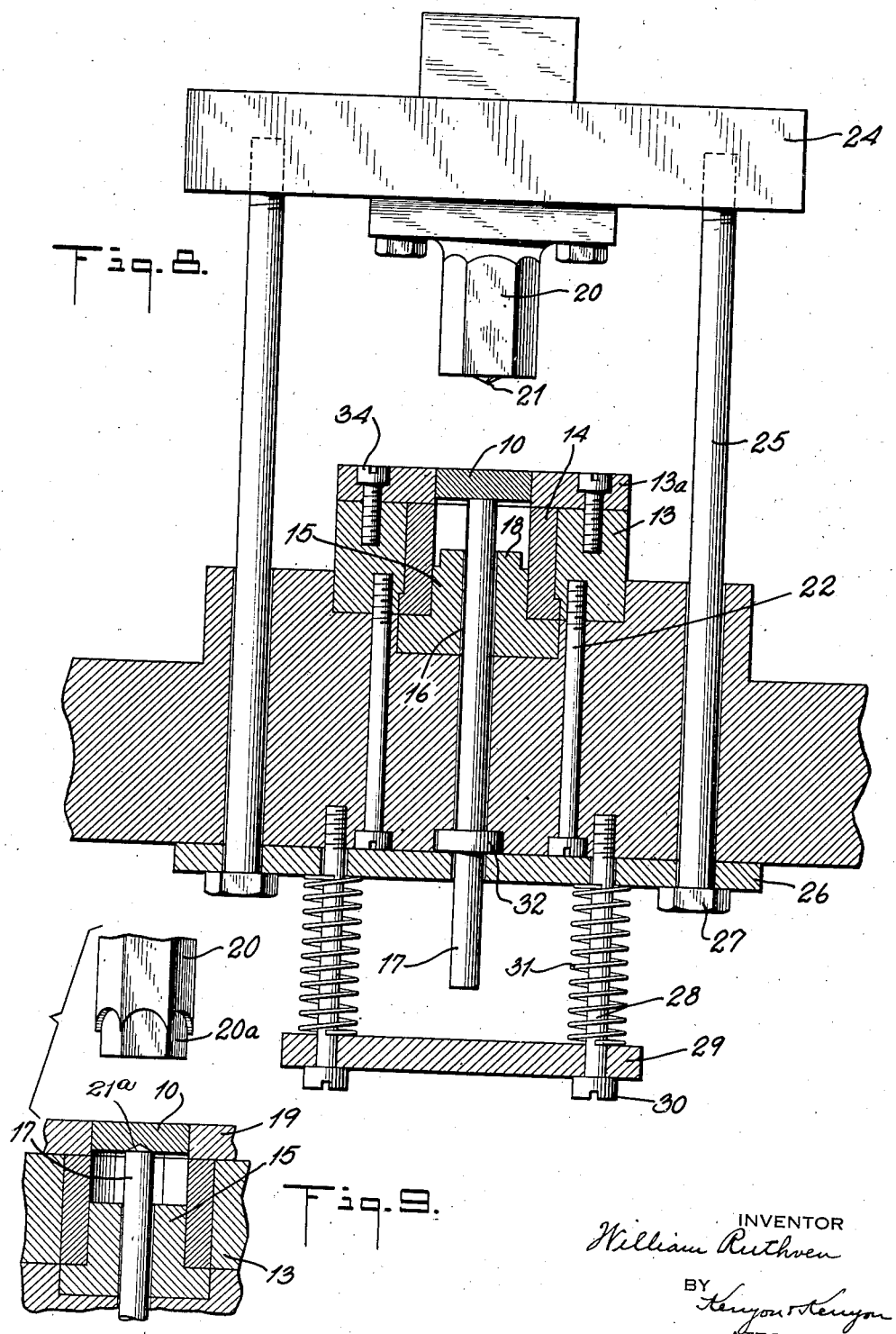

Patented Oct. 5, 1943

2,330,999

UNITED STATES PATENT OFFICE 2,330,999

MANUFACTURE OF SELF-LOCKING NUTS

William Ruthven, Oak Park, Ill., assignor to Allied Control Company, Inc., New York, N. Y., a corporation of New York Application February 6, 1943, Serial No. 474,926

12 Claims. (Cl. 10—86)

This invention relates to the manufacture of lock nuts of the type described and claimed in applicant's copending application, Serial No. 472,333, filed January 14, 1943. The nut disclosed in said application comprises a metallic polygonal body or bottom having a central threaded aperture and a polygonal socket composed of connected flat wall portions integral with the bottom. A locking member of complemental configuration to the socket is received therein and has an opening therethrough alined with the bottom aperture. Each wall portion has an integral tapered tab, the base of which is co-extensive with the top edge of the wall portion and is bent inwardly over the locking member to hold the latter in the socket.

An object of this invention is a highly efficient procedure of producing such nut from a metal blank at a high production rate.

According to one embodiment of this invention, a polygonal cross-section flat metal blank of the same size as the bottom portion of the finished nut is introduced into a polygonal die, closed at one end and of the same cross-section as the blank and a punch is pressed against the blank, the punch being of the same cross-section as the blank. Either the punch or the die is provided on each face with a recess of the same shape and size as a wall portion and the tab extending therefrom of the finished nut. Pressure is applied by the punch to the blank to cause metal from the blank to flow into the recesses thereby forming the connected wall portions and tabs extending therefrom. The shell thus formed is removed from the die and the threaded bottom aperture provided, after which the locking member is introduced into the socket and the tabs turned in to hold such member in the socket. According to this procedure, the shell, together with its wall portions equipped with tapering tabs, is produced in a one-operation procedure.

Other objects, novel features and advantages of this invention will become apparent from the following specification and accompanying drawings, wherein:

Fig. 8 is a vertical section of an apparatus for converting the blank into a shell, and Fig. 9 is a fragmentary section corresponding to Fig. 8 of a modification.

Figure 1:
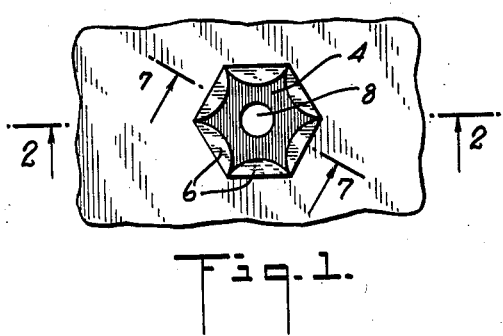
Fig. 1 is a plan view of a self-locking nut embodying the invention with a bolt inserted and serving to hold together two plates.
Figure 2:
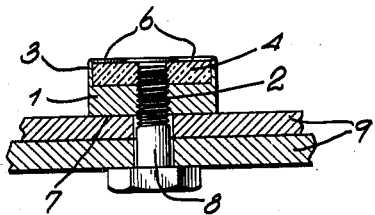
Fig. 2 is a section on the line 2—2 of Fig. 1.

As illustrated in Figs. 1, 2, 6 and 7, one form of nut produced according to this invention comprises a metallic polygonal body or bottom 1 having a central threaded aperture 2 and a polygonal socket composed of connected flat wall portions 3 integral with said bottom. A resilient insert 4 of complemental configuration to the socket is received therein and has an opening 5 therethrough alined with the axis of the thread of the aperture 2 and of a diameter less than the major diameter of the aperture thread. Each wall portion 3 has an integral arcuate extension or tab 6, the base of which is co-extensive with the top edge of the wall portion. The tabs 6 are bent inwardly over the insert to hold it in the socket and the taper of each tab is such that when folded in it does not interfere with the adjacent tab. Together the tabs provide a substantially continuous clamping flange along the rim of the socket to retain the insert 4 securely in place and prevent ejection of the insert from the socket upon insertion of a bolt into the insert through the threaded aperture 2. The end surface 7 constitutes the face of the nut. As shown in Fig. 2, a bolt 8 passes through two or more plates 9 or the like to be held together and is first entered into the bottom aperture 2, after which it passes through the bore 5 of the insert 4 in the surface of which it forces its thread. The surface 7 thus constitutes the abutting face of the nut when the nut is drawn home. The resilient insert 4 is shown herein as being non-metallic, but may be metallic.

Figure 3:
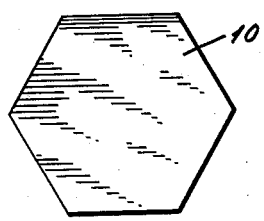
Figs. 3 and 4 are plan views of blanks for use in producing a nut according to the invention.

One form of blank 10 from which the nut above described may be made according to this invention is shown in Fig. 3 and is of the same configuration as the bottom of the nut to be produced but of greater thickness. The blank 11 shown in Fig. 4 differs from the blank shown in Fig. 3 only in the fact that it has a central perforation 12 whereas the blank 10 is imperforate.

Figure 5:
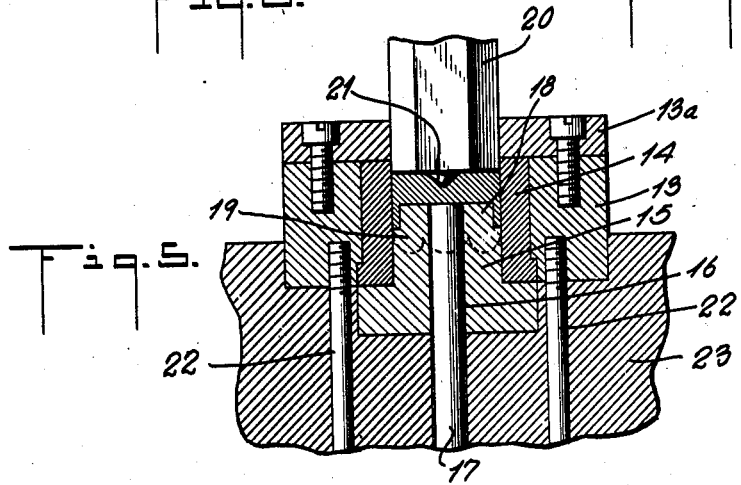
Fig. 5 illustrates the procedure of converting a blank into a shell according to this invention.

A procedure of constructing a shell from the blank 10 is illustrated in Fig. 5. In this figure, 13 designates a fixed block in which is supported a die 14 of the same size as the exterior of the nut 10 to be constructed and is of the same size and shape as the bottom of the nut to be produced. In the die is arranged a fixed abutment 15 having a central bore 16 in which is arranged a rod 17. The upper portion 18 of the abutment 15 is of hexagonal configuration and is of the same size as the interior size of the shell of the finished nut. Below the portion 18 the abutment 15 is provided with a series of tapered indentations 19 corresponding in size and shape to the tabs 6. The space between the upper portion of the abutment 15 and the inner wall of the die 14 together with the indentations 19 corresponds in shape and size to the socket wall and the tabs extending therefrom. A holder 13a having a central aperture or nest of the same size and shape as the blank is provided for locating the blank in proper orientation with respect to the die. A hexagonal punch 20 is supported for reciprocation into and out of the die and means, later to be described, are provided for effecting reciprocation of the punch. The punch is the same size as the die and is provided with a central spear 21.

After the blank 10 has been positioned in the nest 13a with the rod 17 in raised position, the punch 20 is moved downwardly into contact with the top surface of the blank and sufficient pressure is applied to cause downward movement of the blank 10 into engagement with the abutment 15. Further pressure applied by the plunger 20 enters the spear 21 into the blank to form a recess or countersink of the same size and shape as the spear and also extrudes metal from the blank into the space between the upper portion of the abutment 15 and the inner surface of the die 14 as well as into the indentations 19. During downward movement of the punch 20, the spear 21 acts as a pilot as well as produces the countersink 7a.

Figures 6, 7:
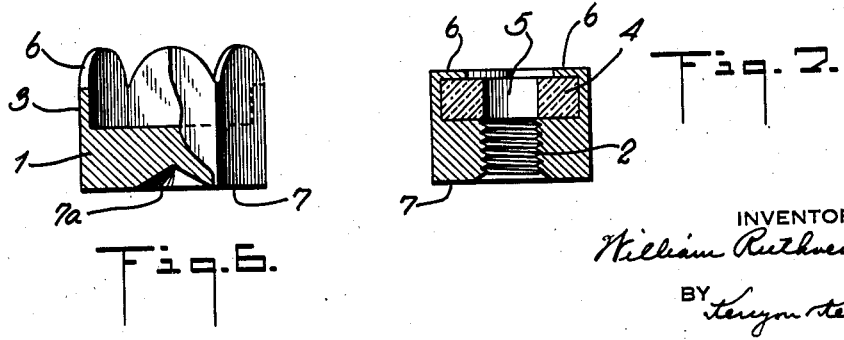
Fig. 6 is an elevation partly in section of the shell produced from the blank of Fig. 3.
Fig. 7 is a section of the completed nut taken substantially on the line 7—7 of Fig. 1.

The shell produced by the procedure just described is illustrated in Fig. 6. The bottom 1 is of less thickness than the original thickness of the blank and the wall portions 3 and tabs 6 are formed from the excess metal in the original blank over and above that present in the bottom 1. Also, a countersink 7a is provided in the face 7 of the shell. The bottom 1 is now punched and tapped to provide the threaded aperture 2 which constitutes a continuation of the countersink 7a. The assembly of the nut is completed by introducing the insert 4 into the socket and turning the tabs 6 inwardly over the insert to secure it in the socket.

In Fig. 8 is illustrated apparatus for effecting the procedure above described. The block 13, die 14 and abutment 15 are attached by bolts 22 to the die shoe 23. The punch 20 is supported by the punch holder 24 and rods 25 extend downwardly from the punch holder 24 through the die shoe 23. A plate 26 underlies the die shoe 23 and has apertures through which extend the rods 25, each of which is equipped with a nut 27 bearing against the lower surface of the plate 26. A pair of rods 28 are carried by the die shoe 23 and pass through apertures in the plate 26 as well as through apertures in a crossbar 29, each rod being equipped with a head 30 which supports the bar 29. A spring 31 surrounds each rod 28 and is interposed between the plate 26 and the bar 29. The rod 17 is provided with a collar 32 receivable in a recess in the bottom face of the die shoe 23 and engaging the top surface of the plate 26. The lower portion of the rod 17 passes through the plate 26 and the lower end of said rod is spaced from the crossbar 29 when the rod is in raised position but engages said cross-bar 29 when the rod 17 is moved downwardly sufficient to bring the top end of the rod flush with the top surface of the abutment 15. The springs 31 bias the plate 26 and rod 17 into the position shown in Fig. 8. The nest 13a is attached to the block 13 by bolts 34 and is in alinement with the die 14.

In the operation of this device, the punch 20 moves downwardly thereby engaging the spear 21 with the top surface of the blank, the bottom surface of which is engaged by the rod 17 and the springs 31 are compressed to oppose downward movement thereof. The rods 25 also move downwardly through the plate 26 a distance equal to the travel of the punch 20 before it engages the blank. Continued downward movement of the punch 20 forces the blank into engagement with the abutment 15 to push the spear 21 into the blank to produce the countersink 7a and cause extrusion of metal of the blank by the punch 20, into the space between the upper portion of the abutment 15 and the inner surface of the die 14 and into the indentations 19. Also, the rod 17, together with the plate 26 is pushed downwardly against the action of the springs 31. During the extrusion operation, the rods 25 move additionally downwardly through the plate 26 to the extent of the reduction in thickness of the blank. After completion of its downward stroke, the punch 20 returns to its uppermost position leaving the formed shell at the bottom of the die. The shell is retained at the bottom of the die by reason of the friction exerted between it and the interior of the die as well as the exterior of the upper portion of the abutment 15, such friction being greater than the upper pressure exerted by the springs 31. However, after a predetermined upward movement of the punch, the nuts 27 engage the plate 26 to lift it and the rod 17 upwardly thereby ejecting the socket from the die.

Figure 4:
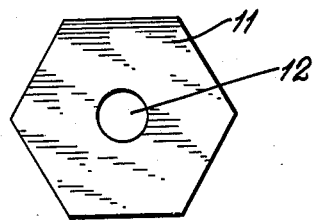

In the practice of this procedure with the perforated blank 11 of Fig. 4, the spear projects into the perforation 12 and provides the countersink 7a at the end of a central aperture of smaller diameter than the original perforation 12, the perforation being contracted by the reasons of metal flow thereinto. The socket produced from the blank 11 corresponds to the socket in Fig. 6 except for a perforation leading from the countersink to the body 1. Such socket, however, is punched and tapped as previously described to produce the threaded aperture 2 illustrated in Fig. 7.

In Fig. 9 is illustrated a modification wherein the top surface of the abutment 15 extends to the inner surface of the die and the lower end of the punch to a depth equal to the height of a wall portion is reduced to the size of the interior of the socket and each face of the punch above the reduced portion is provided with a recess 20a of the same shape and size as the tab 6. Also, the spear 21a is provided on the rod 17 instead of on the punch 20. A blank introduced into the nest of the modification of Fig. 9 is forced by the punch 20 into engagement with the abutment 15 as previously described to cause extrusion of the metal of the blank. The extruded metal flows into the space provided by the reduced lower end portion of the punch 20 and the recesses 20a provided in the punch faces, thereby forming the wall portions 3 and tabs 6 while the spear 21a produces the countersink 7a.

It is of course understood that various modifications may be made in the apparatus and procedure above described without in any way departing from the spirit of the invention as defined in the appended claims. In addition, it is apparent that while the procedure has been described in respect to a blank of the same configuration as the bottom of the finished nut, blanks of other shapes receivable within the die may be used. Such blanks will be of sufficient additional thickness to provide the metal necessary to form the bottom 1 and the wall portions 3 as well as the tabs 6.

I claim:

1. The method of converting a flat metal blank into a shell consisting of a polygonal bottom and a polygonal socket defined by a connected series of wall portions each terminating in a tapering tab, said method comprising introducing said blank into a closed end die member of the same cross-section as said bottom, advancing against said blank a punch member of the same cross-section as said die member, one of said members being provided on each face with a recess of the same size and shape as a wall portion and the tab extending therefrom, and applying pressure by said punch to said blank to cause metal from said blank to flow into said recesses.

2. The method of converting a flat metal blank into a shell consisting of a polygonal bottom and a polygonal socket defined by a connected series of wall portions each terminating in a tapering integral tab, said method comprising introducing said blank into a closed end die of the same cross-section as said bottom, and having each face terminating in a recess of the same shape and size as a wall portion and the tab extending therefrom, advancing against said blank a punch of the same cross-section as said die and applying pressure by said punch to said blank to cause metal from the blank to flow into said recesses.

3. The method of converting a flat metal blank into a shell consisting of a polygonal bottom and a polygonal socket defined by a connected series of wall portions each terminating in a tapering integral tab, said method comprising introducing said blank into a closed end die of the same cross-section as said bottom, advancing against said blank a punch of the same cross-section as said die and having each face provided with a recess of the same shape and size as a wall portion and a tab extending therefrom, and applying pressure by said punch to said blank to cause metal from the blank to flow into said recess.

4. The method of converting a flat polygonal metal blank into a shell consisting of a polygonal bottom and a polygonal socket defined by a connected series of wall portions each terminating in a tapering integral tab, said method comprising introducing said blank into a closed end die member of the same cross-section as said blank, advancing against said blank a punch member of the same cross-section as said blank, one of said members being provided on each face with a recess of the same shape and size as a wall portion and the tab extending therefrom, and applying pressure by said punch to said blank to cause metal from said blank to flow into said recesses.

5. The method of converting a flat polygonal metal blank into a shell consisting of a polygonal bottom and a polygonal socket defined by a connected series of wall portions each terminating in a tapering integral tab, said method comprising introducing said blank into a closed end die of the same cross-section as said blank and having each face terminating in a recess of the same size and shape as a wall portion and the tab extending therefrom, advancing against said blank a punch of the same cross-section as said blank and applying pressure by said punch to said blank to cause metal from the blank to flow into said recesses.

6. The method of converting a flat polygonal metal blank into a shell consisting of a polygonal bottom and a polygonal socket defined by a connected series of wall portions each terminating in a tapering integral tab, said method comprising introducing said blank into a closed end die of the same cross-section as said blank, advancing against said blank a punch of the same cross-section as said blank and having each face provided with a recess of the same shape and size as a wall portion and a tab extending therefrom and applying pressure by said punch to said blank to cause metal from the blank to flow into said recesses.

7. The method of producing a self-locking nut which comprises converting a flat metal blank into a shell consisting of a polygonal bottom and a polygonal socket defined by a connected series of wall portions each terminating in a tapering integral tab by introducing said blank into a closed end die member of the same cross-section as said body and advancing against said blank a punch member of the same cross-section as said die member, one of said members being provided at each face with a recess of the same shape and size as a wall portion and the tab extending therefrom to cause metal from said blank to flow into said recesses, providing a central aperture in said bottom, introducing a locking member into said socket and turning said tabs into contact with said member to retain the same in said socket.

8. The method of producing a self-locking nut which comprises converting a flat metal blank into a shell consisting of a polygonal bottom and a polygonal socket defined by a connected series of wall portions each terminating in a tapering integral tab by introducing said blank into a closed end die member of the same cross-section as said body with each face having a recess of the same shape and size as a wall portion and the tab extending therefrom and advancing against said blank, a punch member of the same cross-section as said die member to cause metal from said blank to flow into said recesses, providing a central aperture in said bottom, impressing a locking member into said socket and turning said tabs into contact with said member to retain the same in said socket.

9. The method of producing a self-locking nut which comprises converting a flat metal blank into a shell consisting of a polygonal bottom and a polygonal socket defined by a connected series of wall portions each terminating in a tapering integral tab by introducing said blank into a closed end die member of the same cross-section as said body and advancing against said blank a punch member of the same cross-section as said die member, with each face having a recess of the same shape and size as a wall portion and the tab extending therefrom to cause metal from said blank to flow into said recesses, providing a central aperture in said bottom, introducing a locking member into said socket and turning said tabs into contact with said member to retain the same in said socket.

10. The method according to claim 7 characterized by said metal blank being of the same cross-section as said die member.

11. The method according to claim 8 characterized by said metal blank being of the same cross-section as said die member.

12. The method according to claim 9 characterized by said metal blank being of the same cross-section as said die member.

WILLIAM RUTHVEN.